(12) United States Patent
Itakura (10) Patent No.: US 12,465,311 B2
(45) Date of Patent: Nov. 11, 2025

(54) SYSTEMS AND METHODS FOR AUTOMATED DIAGNOSIS AND PROGNOSIS SUPPORT USING RADIOMICS

(71) Applicant: The Board of Trustees of the Leland Stanford Junior University, Stanford, CA (US)

(72) Inventor: Haruka Itakura, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 232 days.

(21) Appl. No.: 18/322,477

(22) Filed: May 23, 2023

(65) Prior Publication Data

US 2023/0404509 A1     Dec. 21, 2023

Related U.S. Application Data

(60) Provisional application No. 63/365,194, filed on May 23, 2022.

(51) Int. Cl.
*A61B 6/00* (2024.01)
*A61B 6/50* (2024.01)
(Continued)

(52) U.S. Cl.
CPC ............ *A61B 6/502* (2013.01); *A61B 6/5205* (2013.01); *G06T 7/0012* (2013.01); *G06T 7/11* (2017.01);
(Continued)

(58) Field of Classification Search
CPC ...... A61B 6/502; A61B 6/5205; G06T 7/0012; G06T 7/11; G06T 7/12;
(Continued)

(56) References Cited

U.S. PATENT DOCUMENTS

2022/0130049 A1* 4/2022 Song .................... G06T 7/136
2022/0208355 A1* 6/2022 Li ......................... G06T 7/174

OTHER PUBLICATIONS

Li et al., "Prediction for Distant Metastasis of Breast Cancer Using Dynamic Contrast-Enhanced Magnetic Resonance Imaging Images under Deep Learning", Published Jun. 8, 2022, Computational Intelligence and Neuroscience, vol. 2022, Article ID: 6126061, pp. 1-7. (Year: 2022).*

(Continued)

*Primary Examiner* — Mark R Gaworecki
(74) *Attorney, Agent, or Firm* — KPPB LLP (57) ABSTRACT

Systems and methods for automated diagnosis and prognosis support using radiomics in accordance with embodiments of the invention are illustrated. One embodiment includes a method for non-invasively identifying triple negative breast cancer, comprising obtaining a magnetic resonance imaging scan of a patient's breast, generating a tumor segmentation mask for the scan of the patient using a first machine learning model, extracting several radiomic features from the segmented scan of the patient, providing the several radiomic features to a second machine learning model, and obtaining, from the second machine learning model, a likelihood that the patient has triple negative breast cancer. In a further embodiment, the second machine learning model further provides an estimated survival time of the patient.

18 Claims, 5 Drawing Sheets

(51) Int. Cl.
*G06T 7/00* (2017.01)
*G06T 7/11* (2017.01)
*G06T 7/12* (2017.01)
*G06V 10/44* (2022.01)
*G06V 10/764* (2022.01)
*G06V 10/82* (2022.01)
*G16H 20/00* (2018.01)
*G16H 30/40* (2018.01)
*G16H 40/67* (2018.01)
*G16H 50/20* (2018.01)
*G16H 50/30* (2018.01)
*G16H 30/20* (2018.01)

(52) U.S. Cl.
CPC ............... *G06T 7/12* (2017.01); *G06V 10/44* (2022.01); *G06V 10/764* (2022.01); *G06V 10/82* (2022.01); *G16H 20/00* (2018.01); *G16H 30/40* (2018.01); *G16H 40/67* (2018.01); *G16H 50/20* (2018.01); *G16H 50/30* (2018.01); *G06T 2207/10088* (2013.01); *G06T 2207/20081* (2013.01); *G06T 2207/20084* (2013.01); *G06T 2207/30068* (2013.01); *G06T 2207/30096* (2013.01); *G06V 2201/03* (2022.01); *G16H 30/20* (2018.01)

(58) Field of Classification Search
CPC . G06T 2207/10088; G06T 2207/20081; G06T 2207/20084; G06T 2207/30068; G06T 2207/30096; G06V 10/44; G06V 10/764; G06V 10/82; G06V 2201/03; G16H 20/00; G16H 30/20; G16H 30/40; G16H 40/67; G16H 50/20; G16H 50/30
See application file for complete search history.

(56) References Cited

OTHER PUBLICATIONS

"Pyradiomics", Retrieved from: https://pyradiomics.readthedocs.io/en/latest/, 2016.

Itakura, Haruka, "Multi-Scale Data Integration Frameworks for Predicting Outcomes in Cancer", Dissertation, Stanford University, Mar. 2016.

Itakura et al., "Magnetic resonance image features identify glioblastoma phenotypic subtypes with distinct molecular pathway activities", Science Translational Medicine, vol. 7, No. 303, Sep. 2, 2015, manuscript, 22 pgs.

Itakura et al., "MRI can help to stratify patients with glioblastoma", Nature Reviews Neurology, vol. 11, No. 548, 2015, Published online Sep. 15, 2015.

Kohl et al., "A Probabilistic U-Net for Segmentation of Ambiguous Images", arXiv: 1806.05034v2, Oct. 29, 2018.

* cited by examiner

SYSTEMS AND METHODS FOR AUTOMATED DIAGNOSIS AND PROGNOSIS SUPPORT USING RADIOMICS

CROSS-REFERENCE TO RELATED APPLICATIONS

The current application claims priority under 35 U.S.C. 119(e) to U.S. Provisional Patent Application Ser. No. 63/365,194, entitled "Systems and Methods for Predicting Clinical Outcomes from Imaging Data", filed May 23, 2022. The disclosure of U.S. Provisional Patent Application Ser. No. 63/365,194 is incorporated herein by reference in its entirety.

STATEMENT OF FEDERALLY SPONSORED RESEARCH

This invention was made with Government support under contract ES026832 awarded by the National Institutes of Health. The Government has certain rights in the invention.

FIELD OF THE INVENTION

The present invention generally relates to predicting diagnosis, prognosis, and targeted treatment based on radiomics features extracted from medical images.

BACKGROUND

Radiology is a branch of medicine that uses imaging technologies to diagnose and treat disease. There are many different modalities in medical imaging that enable non-invasive investigation of internal body structures including (but not limited to) magnetic resonance imaging (MRI), computerized tomography (CT), positron emission tomography (PET), and x-ray imaging. Radiomics is the extraction of pixel-level features from medical images via image processing methods.

SUMMARY OF THE INVENTION

Systems and methods for automated diagnosis and prognosis support using radiomics in accordance with embodiments of the invention are illustrated. One embodiment includes a method for non-invasively identifying triple negative breast cancer, comprising obtaining a magnetic resonance imaging scan of a patient's breast, generating a tumor segmentation mask for the scan of the patient using a first machine learning model, extracting several radiomic features from the segmented scan of the patient, providing the several radiomic features to a second machine learning model, and obtaining, from the second machine learning model, a likelihood that the patient has triple negative breast cancer.

In a further embodiment, the second machine learning model further provides an estimated survival time of the patient.

In still another embodiment, the several radiomics features comprises Original_shape_SphericalDisproportion, Original_shape_Elongation, Original_shape_Flatness, Original_glcm_Correlation, Original_glcm_InverseDifferenceMomentNormalized, Original_glrlm_RunEntropy, Log10_original_glszm_LargeAreaHighGraylLevelEmphasis, Log-sigma-5-mm-3D_firstorder_Kurtosis, Log-sigma-5-mm-3D_glcm_informationalMeasureofCorrelation2, Log-sigma-5-mm-3D_glszm_GrayLevelNonUniformityNormalized, Log-sigma-3 mm-3D_firstorder_Kurtosis, Cbrt_log-sigma-3 mm-3D_glcm_ClusterShade, Log-sigma-3-mm-3D_glcm_InverseVariance, Log-sigma-3-mm-3D_glszm_SizeNoneNonUniformityNormalized, Log-sigma-1-mm-3D_firstorder_Skewness, Log-sigma-1-mm-3D_glcminverseDifferenceMomentNormalized, Log-sigma-1-mm-3D_glcm_MaximumalCorrelationCoefficient, Log10_log-sigma-1-mm-3D_glrlm_ShortRunLowGrayLevelEmphasis, Log-sigma-1-mm-3D_glszm_SizeZoneNonUniformityNormalized, Wavelet_HHH_firstorder_Kurtosis, Wavelet_HHH_firstorder_Skewness, Cbrt_wavelet-HHH_glcm_ClusterShade, Wavelet_HHH_glcm_DifferenceAverage, Wavelet-HHH_glcminverseVariance, Wavelet-HHH_glcm_MaximumCorrelationCoefficient, Wavelet-HHH_glszm_SizeZoneNonUniformityNormalized, Cbrt_wavelet-LLL_glcm_ClusterShade, and Log10_wavelet-LLL_glcm_MaximumProbability.

In a still further embodiment, the method further includes steps for extracting a second several radiomic features from the segmented scan of the patient, providing the second several radiomic features to a third machine learning model, and obtaining, from the third machine learning model, a likelihood that the patient has a BRCA gene mutation.

In yet another embodiment, the second several radiomics features comprises Original_shape_Flatness, Original_firstorder_Kurtosis, Original_firstorder_Skewness, Original_glcm_InverseDifferenceMomentNormalized, Original_glcm_MaximumCorrelationCoefficient, Log10_original_glrlm_LongRunLowGrayLevelEmphasis, Log10sigma-5-mm-3D_firstorder_Kurtosis, Log10sigma-5-mm-3D_firstorder_Skewness, Cbrt_log-sigma-5-mm-3D_glcm_ClusterShade, 3D_glcm_InformationalMeasureofCorrelation1, Log-sigma-5-mm-Log10_log-sigma-5-mm-3D_glrlm_LongRunHighGrayLevelEmphasis, Kig0sigma-5-mm-3D_glrlm_RunEntropy, Log-sigma-5-mm-3D_glszm_SizeZoneNonUniformityNormalized, Log10_log-sigma-5-mm-3D_glszm_ZonePercentage, Log-sigma-3-mm-3D_firstorder_Kurtosis, Log-sigma-3-mm-3D_firstorder_Skewness, Cbrt_log-sigma-3-dmm-3D_glcm_ClusterShade, Log-sigma-5-mm-3D_glcm_InformationalMeasureofCorrelation2, Log-sigma-3-dmm-3D_glszm_SmallAreaEmphasis, Log-sigma-1-mm-3D_firstorder_Kurtosis, Log-sigma-1-mm-3D_firstorder_Skewness, Cbrt_log-sigma-1-mm-3D_glcm_ClusterShade, Log-sigma-1-mm-3D_glcm_InformationalMeasureofCorrelation1, Log-sigma-1-mm-3D_glcm_MaximumCorrelationCoefficient, Log10_log-sigma-1-mm-3D_glszm_SmallAreaLowGrayLevelEmphasis, Wavelet-HHH_firstorder_Skewness, Wavelet-HHH_glcminverseDifferenceMomentNormalized, Wavelet-HHH_glcminverseVariance, Wavelet-HHH_glcm_MaximalCorrelationCoefficient, Log10_wavelet-HHH_glrlm_LongRunEmphasis, Wavelet-HHH_glszm_SizeZoneNonUniformityNormalized, Wavelet-HHH_glszm_SmallAreaEmphasis, Wavlet-LLL_glcm_Correlation, and Log10_wavelet-LLL_glcm_MaximumProbability In a yet further embodiment, the first machine learning model includes a variational autoencoder and a U-Net.

One embodiment includes a system for non-invasively identifying triple negative breast cancer, comprising a processor, and a memory, the memory containing a radiomic prediction application that configures the processor to obtain a magnetic resonance imaging scan of a patient's breast, generate a tumor segmentation mask for the scan of the patient using a first machine learning model, extract several radiomic features from the segmented scan of the patient, provide the several radiomic features to a second machine learning model, and obtain, from the second machine learning model, a likelihood that the patient has triple negative breast cancer.

In another additional embodiment, the second machine learning model further provides an estimated survival time of the patient.

In a further additional embodiment, the several radiomics features comprises Original_shape_SphericalDisproportion, Original_shape_Elongation, Original_shape_Flatness, Original_glcm_Correlation, Original_glcm_InverseDifferenceMomentNormalized, Original_glrlm_RunEntropy, Log10_original_glszm_LargeAreaHighGraylLevelEmphasis, Log-sigma-5-mm-3D_firstorder_Kurtosis, Log-sigma-5-mm-3D_glcm_informationalMeasureofCorrelation2, Log-sigma-5-mm-3D_glszm_GrayLevelNonUniformityNormalized, Log-sigma-3 mm-3D_firstorder_Kurtosis, Cbrt_log-sigma-3 mm-3D_glcm_ClusterShade, Log-sigma-3-mm-3D_glcm_InverseVariance, Log-sigma-3-mm-3D_glszm_SizeNoneNonUniformityNormalized, Log-sigma-1-mm-3D_firstorder_Skewness, Log-sigma-1-mm-3D_glcminverseDifferenceMomentNormalized, Log-sigma-1-mm-3D_glcm_MaximumalCorrelationCoefficient, Log10_log-sigma-1-mm-3D_glrlm_ShortRunLowGrayLevelEmphasis, Log-sigma-1-mm-3D_glszm_SizeZoneNonUniformityNormalized, Wavelet_HHH_firstorder_Kurtosis, Wavelet_HHH_firstorder_Skewness, Cbrt_wavelet-HHH_glcm_ClusterShade, Wavelet_HHH_glcm_DifferenceAverage, Wavelet-HHH_glcminverseVariance, Wavelet-HHH_glcm_MaximumCorrelationCoefficient, Wavelet-HHH_glszm_SizeZoneNonUniformityNormalized, Cbrt_wavelet-LLL_glcm_ClusterShade, and Log10_wavelet-LLL_glcm_MaximumProbability.

In another embodiment again, the radiomic prediction application further configures the processor to extract a second several radiomic features from the segmented scan of the patient, provide the second several radiomic features to a third machine learning model, and obtain, from the third machine learning model, a likelihood that the patient has a BRCA gene mutation.

In a further embodiment again, the second several radiomics features comprises Original_shape_Flatness, Original_firstorder_Kurtosis, Original_firstorder_Skewness, Original_glcm_InverseDifferenceMomentNormalized, Original_glcm_MaximumCorrelationCoefficient, Log10_original_glrlm_LongRunLowGrayLevelEmphasis, Log10sigma-5-mm-3D_firstorder_Kurtosis, Log10sigma-5-mm-3D_firstorder_Skewness, Cbrt_log-sigma-5-mm-3D_glcm_ClusterShade, 3D_glcm_InformationalMeasureofCorrelation1, Log-sigma-5-mm-Log10_log-sigma-5-mm-3D_glrlm_LongRunHighGrayLevelEmphasis, Kig0sigma-5-mm-3D_glrlm_RunEntropy, Log-sigma-5-mm-3D_glszm_SizeZoneNonUniformityNormalized, Log10_log-sigma-5-mm-3D_glszm_ZonePercentage, Log-sigma-3-mm-3D_firstorder_Kurtosis, Log-sigma-3-mm-3D_firstorder_Skewness, Cbrt_log-sigma-3-dmm-3D_glcm_ClusterShade, Log-sigma-5-mm-3D_glcm_InformationalMeasureofCorrelation2, Log-sigma-3-dmm-3D_glszm_SmallAreaEmphasis, Log-sigma-1-mm-3D_firstorder_Kurtosis, Log-sigma-1-mm-3D_firstorder_Skewness, Cbrt_log-sigma-1-mm-3D_glcm_ClusterShade, Log-sigma-1-mm-3D_glcm_InformationalMeasureofCorrelation1, Log-sigma-1-mm-3D_glcm_MaximumCorrelationCoefficient, Log10_log-sigma-1-mm-3D_glszm_SmallAreaLowGrayLevelEmphasis, Wavelet-HHH_firstorder_Skewness, Wavelet-HHH_glcminverseDifferenceMomentNormalized, Wavelet-HHH_glcminverseVariance, Wavelet-HHH_glcm_MaximalCorrelationCoefficient, Log10_wavelet-HHH_glrlm_LongRunEmphasis, Wavelet-HHH_glszm_SizeZoneNonUniformityNormalized, Wavelet-HHH_glszm_SmallAreaEmphasis, Wavlet-LLL_glcm_Correlation, and Log10_wavelet-LLL_glcm_Maximum Probability In still yet another embodiment, the first machine learning model includes a variational autoencoder and a U-Net.

One embodiment includes a non-transitory machine-readable storage medium containing instructions that when executed by a set of one or more processors, configure the one or more processors to obtain a magnetic resonance imaging scan of a patient's breast, generate a tumor segmentation mask for the scan of the patient using a first machine learning model, extract several radiomic features from the segmented scan of the patient, provide the several radiomic features to a second machine learning model, and obtain, from the second machine learning model, a likelihood that the patient has triple negative breast cancer.

In a still yet further embodiment, the instructions, when executed by the set of one or more processors, further configure the one or more processors to obtain from the second machine learning model an estimated survival time of the patient.

In still another additional embodiment, the several radiomics features comprises Original_shape_SphericalDisproportion, Original_shape_Elongation, Original_shape_Flatness, Original_glcm_Correlation, Original_glcm_InverseDifferenceMomentNormalized, Original_glrlm_RunEntropy, Log10_original_glszm_LargeAreaHighGraylLevelEmphasis, Log-sigma-5-mm-3D_firstorder_Kurtosis, Log-sigma-5-mm-3D_glcm_informationalMeasureofCorrelation2, Log-sigma-5-mm-3D_glszm_GrayLevelNonUniformityNormalized, Log-sigma-3 mm-3D_firstorder_Kurtosis, Cbrt_log-sigma-3 mm-3D_glcm_ClusterShade, Log-sigma-3-mm-3D_glcm_InverseVariance, Log-sigma-3-mm-3D_glszm_SizeNoneNonUniformityNormalized, Log-sigma-1-mm-3D_firstorder_Skewness, Log-sigma-1-mm-3D_glcminverseDifferenceMomentNormalized, Log-sigma-1-mm-3D_glcm_MaximumalCorrelationCoefficient, Log10_log-sigma-1-mm-3D_glrlm_ShortRunLowGrayLevelEmphasis, Log-sigma-1-mm-3D_glszm_SizeZoneNonUniformityNormalized, Wavelet_HHH_firstorder_Kurtosis, Wavelet_HHH_firstorder_Skewness, Cbrt_wavelet-HHH_glcm_ClusterShade, Wavelet_HHH_glcm_DifferenceAverage, Wavelet-HHH_glcminverseVariance, Wavelet-HHH_glcm_MaximumCorrelationCoefficient, Wavelet-HHH_glszm_SizeZoneNonUniformityNormalized, Cbrt_wavelet-LLL_glcm_ClusterShade, and Log10_wavelet-LLL_glcm_MaximumProbability.

In a still further additional embodiment, the instructions, when executed by the set of one or more processors, further configure the one or more processors to extract a second several radiomic features from the segmented scan of the patient, provide the second several radiomic features to a third machine learning model, and obtain, from the third machine learning model, a likelihood that the patient has a BRCA gene mutation.

In still another embodiment again, the second several radiomics features comprises Original_shape_Flatness, Original_firstorder_Kurtosis, Original_firstorder_Skewness, Original_glcm_InverseDifferenceMomentNormalized, Original_glcm_MaximumCorrelationCoefficient, Log10_original_glrlm_LongRunLowGrayLevelEmphasis, Log10sigma-5-mm-3D_firstorder_Kurtosis, Log10sigma-5-mm-3D_firstorder_Skewness, Cbrt_log-sigma-5-mm-3D_glcm_ClusterShade, Log-sigma-5-mm-3D_glcm_InformationalMeasureofCorrelation1, Log10_log-sigma-5-mm-3D_glrlm_LongRunHighGrayLevelEmphasis, Kig0sigma-5-mm-3D_glrlm_RunEntropy, Log-sigma-5-mm-3D_glszm_SizeZoneNonUniformityNormalized, Log10_log-sigma-5-mm-3D_glszm_ZonePercentage, Log-sigma-3-mm-3D_firstorder_Kurtosis, Log-sigma-3-mm-3D_firstorder_Skewness, Cbrt_log-sigma-3-dmm-3D_glcm_ClusterShade, Log-sigma-5-mm-3D_glcm_InformationalMeasureofCorrelation2, Log-sigma-3-dmm-3D_glszm_SmallAreaEmphasis, Log-sigma-1-mm-3D_firstorder_Kurtosis, Log-sigma-1-mm-3D_firstorder_Skewness, Cbrt_log-sigma-1-mm-3D_glcm_ClusterShade, Log-sigma-1-mm-3D_glcm_InformationalMeasureofCorrelation1, Log-sigma-1-mm-3D_glcm_MaximumCorrelationCoefficient, Log10_log-sigma-1-mm-3D_glszm_SmallAreaLowGrayLevelEmphasis, Wavelet-HHH_firstorder_Skewness, Wavelet-HHH_glcminverseDifferenceMomentNormalized, Wavelet-HHH_glcminverseVariance, Wavelet-HHH_glcm_MaximalCorrelationCoefficient, Log10_wavelet-HHH_glrlm_LongRunEmphasis, Wavelet-HHH_glszm_SizeZoneNonUniformityNormalized, Wavelet-HHH_glszm_SmallAreaEmphasis, Wavlet-LLL_glcm_Correlation, and Log10_wavelet-LLL_glcm_Maximum Probability In a still further embodiment again, the first machine learning model includes a variational autoencoder and a U-Net.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Medical imaging has been a powerful tool for non-invasively diagnosing patients. Conventionally, specially trained radiologists have been needed to understand medical images and perform the diagnostic process. Recently, machine learning has been used to attempt to replicate the function of the radiologist by providing medical images (either cleaned or unprocessed) directly to a trained neural network which produces an estimated diagnosis. Systems and methods described herein instead use a series of machine learning models to 1) segment lesions in medical images, 2) extract radiomic features, and 3) provide predictive actionable knowledge, including diagnoses, prognostic information, and treatment options based on the radiomic features.

In various embodiments, by performing prediction on radiomic features of a medical image rather than on the image itself, increased diagnostic accuracy can be achieved. Radiomic features that describe tumor phenotypes at the pixel level are associated with clinical characteristics of various cancers. Molecular differences among tumors can be reflected in their structure, which are revealed by structural imaging like (but not limited to) magnetic resonance imaging (MRI). By way of specific example which is discussed further below, radiomics features extracted from MRI can identify triple-negative breast cancer prior to biopsy at early stages of development.

In numerous embodiments, the predictive diagnosis can provide more than merely diagnosis, but also prognostic information and treatment options as well. For example, by using radiomic features as described herein, the predictive model can: predict responses to specific treatments for the identified lesion predict progression-free survival and/or overall survival for a specific treatment; and be used iteratively to monitor responses to treatment over time. In various embodiments, the predictive model can identify the presence of gene mutations and/or specific subtypes of cancer. For example, with respect to breast cancer, triple negative breast cancer (TNBC) can be identified without a biopsy using only an MRI scan. Further BRCA1 or BRCA2 mutations can be identified using only an MRI scan. This is critical for patients because TNBC is extremely aggressive and particularly lethal, and early detection is important for increasing survival rates.

In many embodiments, three main stages of processing occur: a segmentation phase, a feature extraction phase, and a prediction phase. The segmentation phase includes an automated process using machine learning models that automatically segment out tumors from medical images. Conventionally, volumetric tumor segmentation is time intensive and manually intensive, making it unsuitable for routine clinical use, even if it could generate meaningful outputs in cancer screening and monitoring. The automated process described herein can segment irregularly shaped tumors using a variational auto encoder (VAE) integrated into a U-Net machine learning model. Using the VAE-UNET combination architecture, reproducible and accurate segmentation can be performed in an automated manner across many different patient images, while also outperforming U-Net alone in segmenting non-spherical tumors.

In the feature extraction phase, a large number of features (approximately 900) are extracted. One problem with the use of radiomics features is in fact the volume of features that can be extracted from a given image, many of which may not have reproducibly predictive power. In many embodiments, the radiomic features are reduced to a smaller number of principal component vectors. In various embodiments, certain principal component vectors provide a higher degree of information with respect to the prediction. In some embodiments, only principal component vectors over a predetermined threshold of predictive power are provided to the predictive model. In a variety of embodiments, the principal components are weighted by their predetermined predictive power.

In many embodiments, the prediction phase involves training a supervised machine learning model on the extracted radiomics features annotated with ground truth patient data to produce a model which can provide diagnostic and/or prognostic predictions for a given patient when provided with radiomics features extracted from images of lesions of the given patient. Radiomic prediction systems are discussed in further detail below.

Radiomic Prediction Systems

Figure 1:
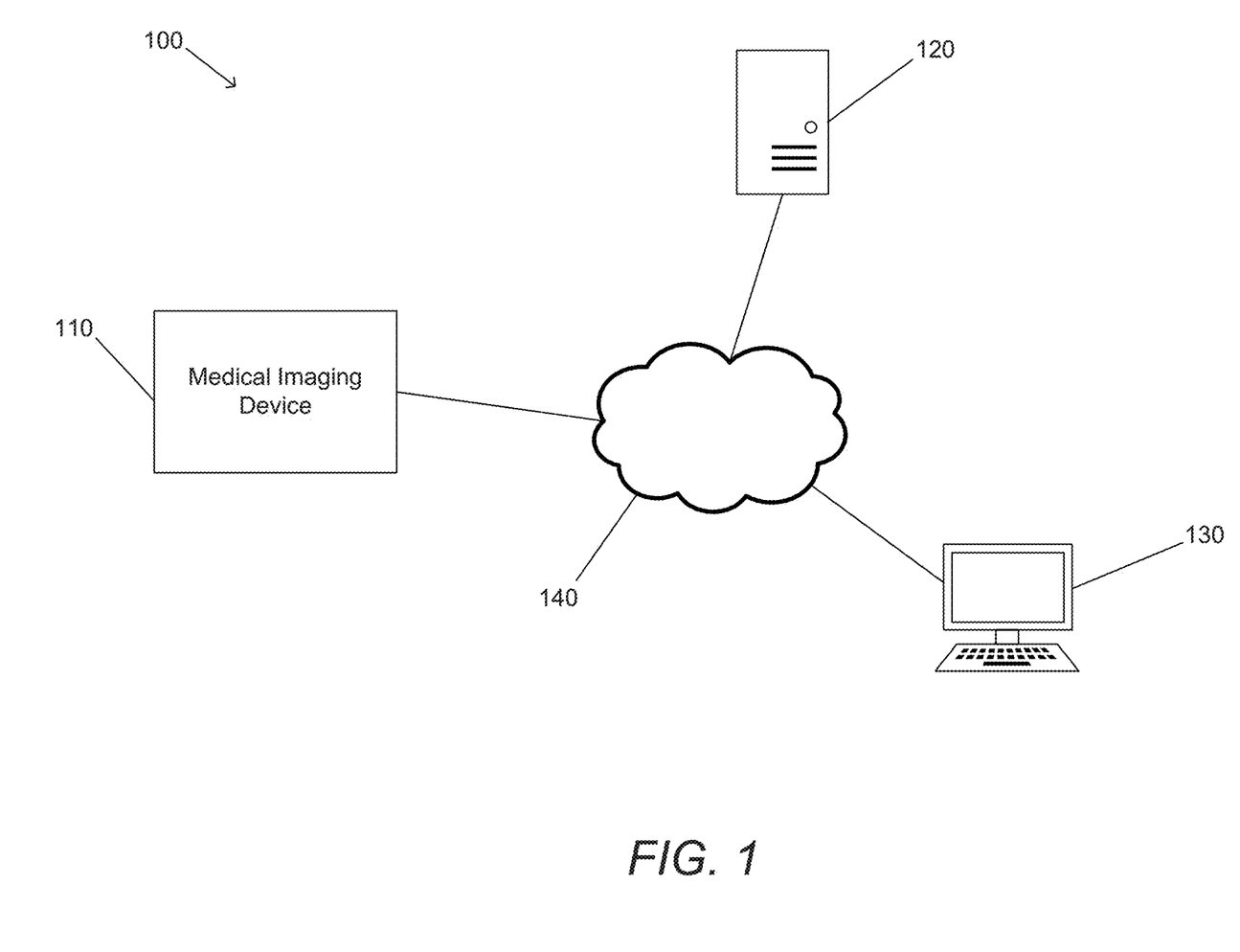
FIG. 1 illustrates a radiomics prediction system in accordance with an embodiment of the invention.

Radiomic prediction systems are computational systems which can ingest medical images and provide diagnostic and/or prognostic predictions for a given patient based on radiomics features extracted from the medical images. Turning now to FIG. 1, radiomic prediction systems are discussed. System 100 includes a medical imaging device 110. In numerous embodiments, the medical imaging device is an MRI machine. However, any number of different medical imaging devices can be used depending as appropriate to the requirements of specific applications of embodiments of the invention. For example, if machine learning models described herein are trained to operate on CT images, a CT scanner may be used instead.

A radiomic prediction server 120 segments and extracts radiomics features from medical images generated by the medical imaging device, and further can process those extracted features to produce diagnostic and/or prognostic predictions. Said predictions can be displayed to medical professionals and other users via terminal 130. The different devices are communicatively coupled via network 140. The network can be wired, wireless, or any combination of different networks as appropriate to the requirements of specific applications of embodiments of the invention. In various embodiments, data may be provided between devices via transport of a physical storage medium, e.g. a compact disc, a flash drive, etc. Further, radiomic prediction servers and terminals may be implemented on the same hardware platform, and are not restricted to being server-grade hardware. In many embodiments, personal computers or laptops may have sufficient computational power to perform processes described herein.

Figure 2:
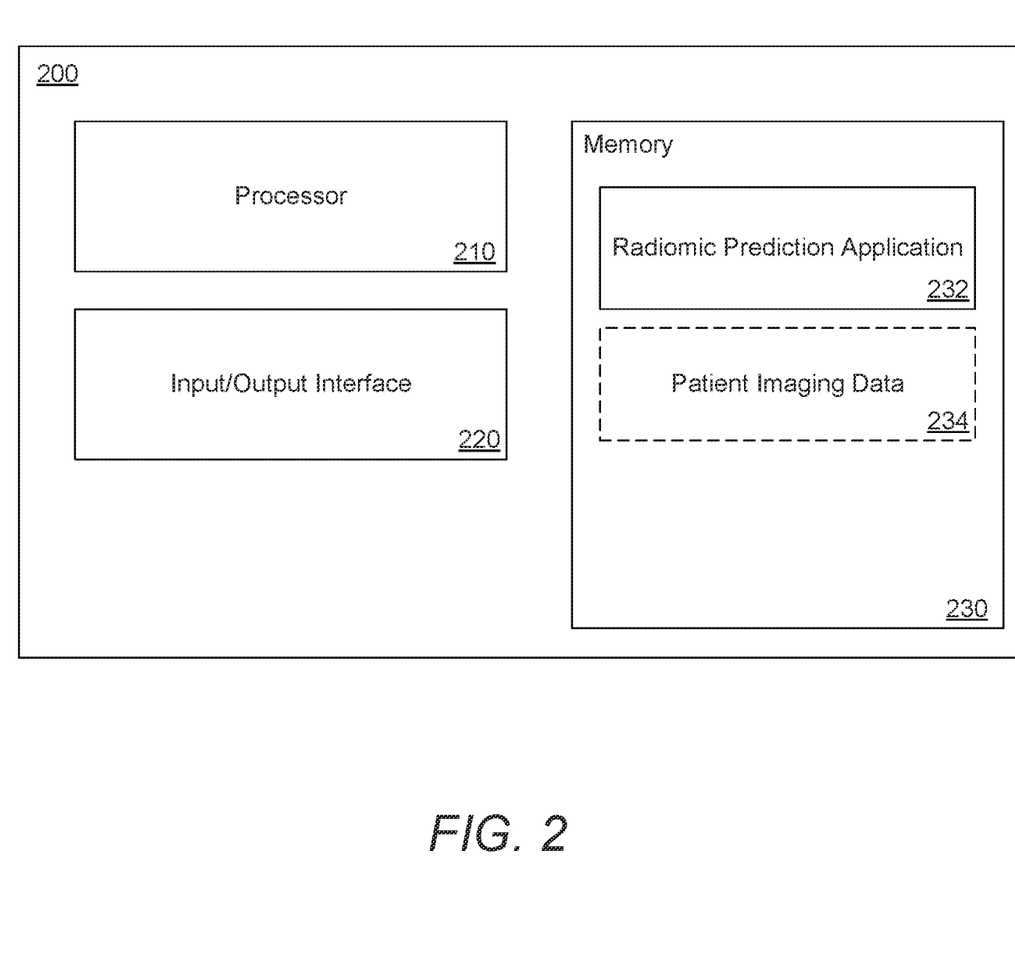
FIG. 2 is a block diagram of a radiomic prediction server in accordance with an embodiment of the invention.

Turning now to FIG. 2, a block diagram for a radiomic prediction server in accordance with an embodiment of the invention is illustrated. Radiomic prediction server 200 includes a processor 210. Processor 210 can be any logic circuit or combination thereof capable of performing processes described herein. In many embodiments, the processor is a central processing unit (CPU), graphics processing unit (GPU), field-programmable gate array (FPGA), application-specific integrated circuit (ASIC), or any other processing device or combination thereof as appropriate to the requirements of specific applications of embodiments of the invention. Radiomic prediction server 200 also includes an input/output (I/O) interface 220. I/O interfaces can transmit and receive data over networks.

Radiomic prediction server 200 additionally includes a memory 230. The memory can be volatile, nonvolatile, or a combination thereof. Memory is a machine readable medium capable of storing instructions and data. Stored within memory 230 is a radiomic prediction application 232 which can figure the processor 200 to perform various radiomic prediction processes described herein. At times, the memory 230 may also contain patient imaging data 234 for a given patient to be processed. As can be readily appreciated, while certain architectures are described above with respect to FIGS. 1 and 2, any number of different computing architectures can be used without departing from the scope or spirit of the invention. Radiomics prediction processes are described below.

Radiomics Prediction Processes

Radiomics prediction processes include three main phases: segmentation, radiomic feature extraction, and prediction. In many embodiments, segmentation is achieved using a VAE-UNet combination architecture which works particularly well for irregular shaped tumors. Once lesions are segmented out of the base medical image, significantly less computational power is required for processing as a smaller volume needs to be processed. Radiomics features can be extracted using any of a variety of methods, and include (but are not limited to) first order statistics, shape-based features (2D, 3D), gray level co-occurrence matrix, gray level run length matrix, gray level size zone matrix, neighboring gray tone difference matrix, and gray level dependence matrix. The features are provided to a predictive machine learning model that is trained to provide diagnostic (i.e. disease classification) and/or prognostic (i.e. life expectancy) predictions based on said features.

In numerous embodiments, the machine learning model is trained to receive a vector of only particularly predictively powerful radiomics features. In numerous embodiments, when the predictive model is trained to identify triple negative breast cancer, the following 28 radiomics features are used (where the names of the radiomics features follow the standard feature naming conventions of Py-Radiomics):

| # | Radiomic Feature |
|---|---|
| 1 | Original_shape_SphericalDisproportion |
| 2 | Original_shape_Elongation |
| 3 | Original_shape_Flatness |
| 4 | Original_glcm_Correlation |
| 5 | Original_glcm_InverseDifferenceMomentNormalized |
| 6 | Original_glrlm_RunEntropy |
| 7 | Log10_original_glszm_LargeAreaHighGraylLevelEmphasis |
| 8 | Log-sigma-5-mm-3D_firstorder_Kurtosis |
| 9 | Log-sigma-5-mm-3D_glcm_informationalMeasureofCorrelation2 |
| 10 | Log-sigma-5-mm-3D_glszm_GrayLevelNonUniformityNormalized |
| 11 | Log-sigma-3 mm-3D_firstorder_Kurtosis |
| 12 | Cbrt_log-sigma-3 mm-3D_glcm_ClusterShade |
| 13 | Log-sigma-3-mm-3D_glcm_InverseVariance |
| 14 | Log-sigma-3-mm-3D_glszm_SizeNoneNonUniformityNormalized |
| 15 | Log-sigma-1-mm-3D_firstorder_Skewness |
| 16 | Log-sigma-1-mm-3D_glcm_InverseDifferenceMomentNormalized |
| 17 | Log-sigma-1-mm-3D_glcm_MaximumalCorrelationCoefficient |
| 18 | Log10_log-sigma-1-mm-3D_glrlm_ShortRunLowGrayLevelEmphasis |
| 19 | Log-sigma-1-mm-3D_glszm_SizeZoneNonUniformityNormalized |
| 20 | Wavelet_HHH_firstorder_Kurtosis |
| 21 | Wavelet_HHH_firstorder_Skewness |
| 22 | Cbrt_wavelet-HHH_glcm_ClusterShade |
| 23 | Wavelet_HHH_glcm_DifferenceAverage |
| 24 | Wavelet-HHH_glcm_InverseVariance |
| 25 | Wavelet-HHH_glcm_MaximumCorrelationCoefficient |
| 26 | Wavelet-HHH_glszm_SizeZoneNonUniformityNormalized |
| 27 | Cbrt_wavelet-LLL_glcm_ClusterShade |
| 28 | Log10_wavelet-LLL_glcm_MaximumProbability |

In a variety of embodiments, when the predictive model is trained to identify BRCA mutations, the following 34 radiomics features are used (where the names of the radiomics features again follow the standard feature naming conventions of Py-Radiomics):

| # | Radiomic Feature |
|---|---|
| 1 | Original_shape_Flatness |
| 2 | Original_firstorder_Kurtosis |
| 3 | Original_firstorder_Skewness |
| 4 | Original_glcm_InverseDifferenceMomentNormalized |
| 5 | Original_glcm_MaximumCorrelationCoefficient |
| 6 | Log10_original_glrlm_LongRunLowGrayLevelEmphasis |
| 7 | Log10sigma-5-mm-3D_firstorder_Kurtosis |
| 8 | Log10sigma-5-mm-3D_firstorder_Skewness |
| 9 | Cbrt_log-sigma-5-mm-3D_glcm_ClusterShade |
| 10 | Log-sigma-5-mm-3D_glcm_InformationalMeasureofCorrelation1 |
| 11 | Log10_log-sigma-5-mm-3D_glrlm_LongRunHighGrayLevelEmphasis |
| 12 | Kig0sigma-5-mm-3D_glrlm_RunEntropy |
| 13 | Log-sigma-5-mm-3D_glszm_SizeZoneNonUniformityNormalized |
| 14 | Log10_log-sigma-5-mm-3D_glszm_ZonePercentage |
| 15 | Log-sigma-3-mm-3D_firstorder_Kurtosis |
| 16 | Log-sigma-3-mm-3D_firstorder_Skewness |
| 17 | Cbrt_log-sigma-3-dmm-3D_glcm_ClusterShade |
| 18 | Log-sigma-5-mm-3D_glcm_InformationalMeasureofCorrelation2 |
| 19 | Log-sigma-3-dmm-3D_glszm_SmallAreaEmphasis |
| 20 | Log-sigma-1-mm-3D_firstorder_Kurtosis |
| 21 | Log-sigma-1-mm-3D_firstorder_Skewness |
| 22 | Cbrt_log-sigma-1-mm-3D_glcm_ClusterShade |
| 23 | Log-sigma-1-mm-3D_glcm_InformationalMeasureofCorrelation1 |
| 24 | Log-sigma-1-mm-3D_glcm_MaximumCorrelationCoefficient |
| 25 | Log10_log-sigma-1-mm-3D_glszm_SmallAreaLowGrayLevelEmphasis |
| 26 | Wavelet-HHH_firstorder_Skewness |
| 27 | Wavelet-HHH_glcm_InverseDifferenceMomentNormalized |
| 28 | Wavelet-HHH_glcm_InverseVariance |
| 29 | Wavelet-HHH_glcm_MaximalCorrelationCoefficient |
| 30 | Log10_wavelet-HHH_glrlm_LongRunEmphasis |
| 31 | Wavelet-HHH_glszm_SizeZoneNonUniformityNormalized |
| 32 | Wavelet-HHH_glszm_SmallAreaEmphasis |
| 33 | Wavlet-LLL_glcm_Correlation |
| 34 | Log10_wavelet-LLL_glcm_MaximumProbability |

By using the radiomics features listed above for predictive modeling as opposed to the complete set of hundreds of radiomics features, not only can the accuracy and precision of the model be increased, but less memory and processing power is required as well. The above enumerated radiomics features have significantly predictive power which is reproducible across different patients.

Figure 3:
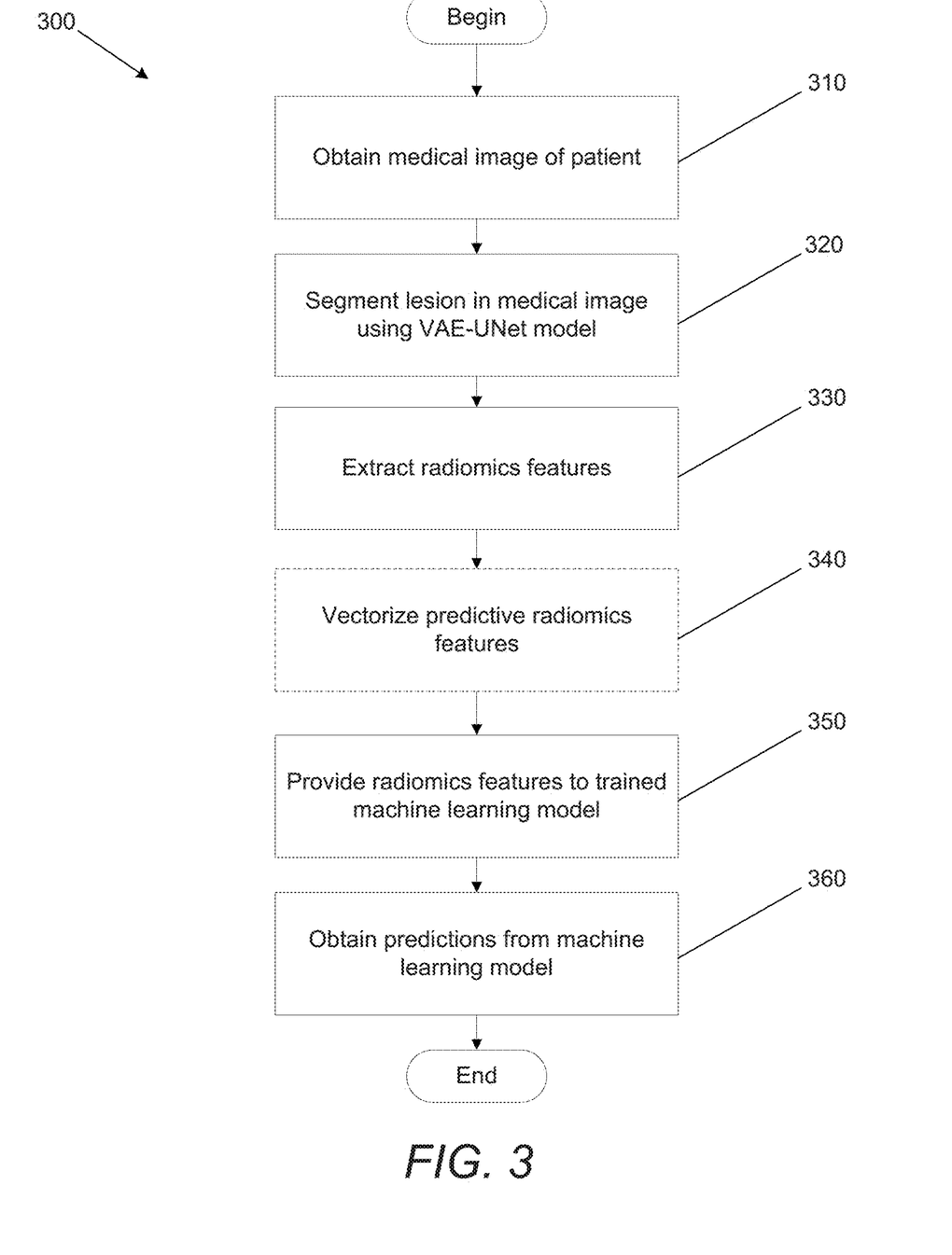
FIG. 3 is a flow chart for a radiomic prediction process in accordance with an embodiment of the invention.

Turning now to FIG. 3, a flowchart for a radiomics prediction process in accordance with an embodiment of the invention is illustrated. Process 300 includes obtaining (310) one or more medical images of a patient. In numerous embodiments, the medical images are volumetric, and "image" refers to the entire 3D scan. The medical images provided to a machine learning model that has a VAE component and a U-Net component, which segments (320) the medical image by extracting only the volume that contains lesions.

Radiomics features are extracted (330) from the lesion-containing volumes. Radiomics features are pixel/voxel-level, quantitative features of digital images that characterize the size, shape, texture, and edge sharpness of tumors using spatial and intensity distribution information from pixels/voxels. In numerous embodiments, the radiomics features are extracted using a standardized toolbox such as Py-Radiomics provided by Harvard University, Cambridge, Massachusetts. However, other tools for extracting radiomics features can be used. It is recommended that the same tool be used for extracting features as that used in the generation of training data for the described machine learning models herein. In numerous embodiments, stratified k-fold cross-validation with L1 regularization is used to select particularly powerful radiomics features. (340). The radiomics features are then provided (350) to a trained machine learning model which has been trained using radiomics features labeled with ground-truth patient outcomes. A prediction on the outcome of the patient is then obtained (360) from the machine learning model. This prediction can be provided to medical professionals to assist with their medical process.

Figure 4:
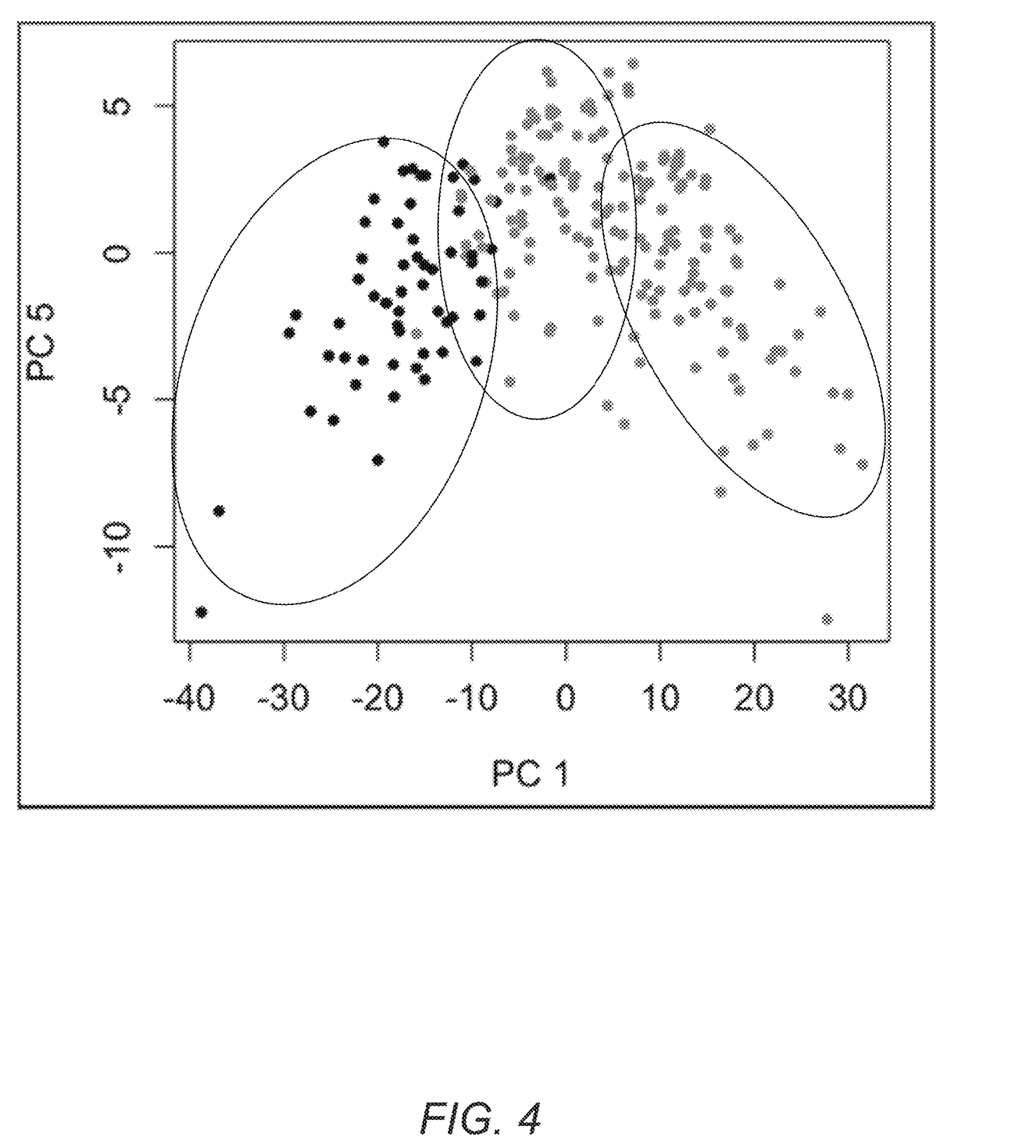
FIG. 4 is a chart illustrating different subtypes of triple negative breast cancer in accordance with an embodiment of the invention.
Figure 5:
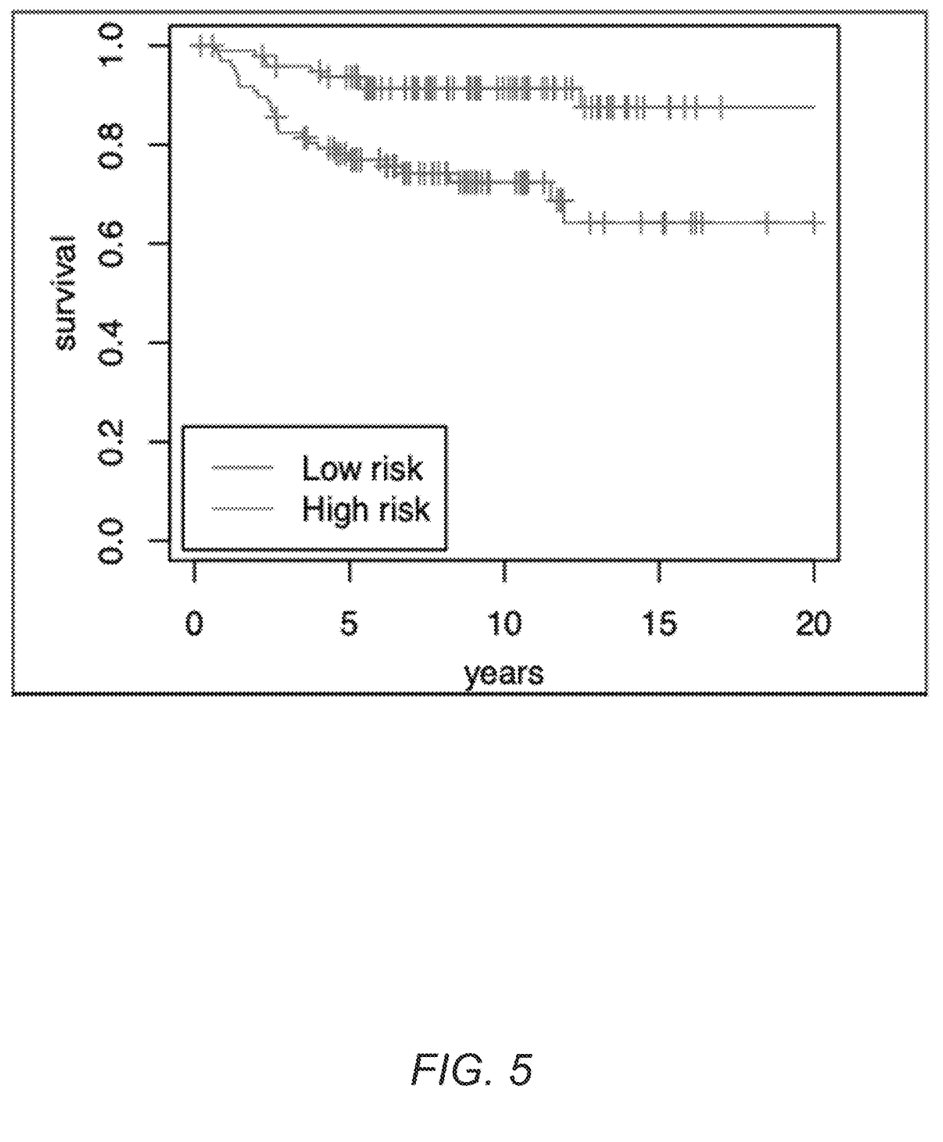
FIG. 5 is a chart showing predicted survival rates for different classified risk groups in accordance with an embodiment of the invention.

Turning now to FIG. 4, a chart showing three subtypes of triple negative breast cancer identified by PCA on radiomics features in accordance with an embodiment of the invention is illustrated. In FIG. 5, a chart showing predicted survival rates for different classified risk groups of patients having triple negative breast cancer in accordance with an embodiment of the invention is illustrated. Low risk patients (top line) are shown to have a 19% absolute difference in overall survival at 10 years compared to the high-risk patients (bottom line).

Although specific systems and methods for radiomics-based prediction are discussed above, many different modifications can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for non-invasively identifying triple negative breast cancer, comprising:
   obtaining a magnetic resonance imaging scan of a patient's breast;
   generating a tumor segmentation mask for the scan of the patient using a first machine learning model;
   extracting a plurality of radiomic features from the segmented scan of the patient;
   providing the plurality of radiomic features to a second machine learning model; and
   obtaining, from the second machine learning model, a likelihood that the patient has triple negative breast cancer.

2. The method of claim 1, wherein the second machine learning model further provides an estimated survival time of the patient.

3. The method of claim 1, wherein the plurality of radiomics features comprises: Original_shape_SphericalDisproportion; Original_shape_Elongation; Original_glcm_Correlation; Original_shape_Flatness; Original_girlm_RunEntropy; Original_glcm_InverseDifferenceMomentNormalized; Log10_original_glszm_LargeAreaHighGrayILevelEmphasis; Log-sigma-5-mm-3D_firstorder_Kurtosis; Log-sigma-5-mm-3D_glcm_informationalMeasureofCorrelation2; Log-sigma-5-mm-3D_glszm_GrayLevelNonUniformityNormalized; Log-sigma-3 mm-3D_firstorder_Kurtosis; Cbrt_log-sigma-3 mm-3D_glcm_ClusterShade; Log-sigma-3-mm-3D_glcm_InverseVariance; Log-sigma-3-mm-3D_glszm_SizeNoneNonUniformityNormalized; Log-sigma-1-mm-3D_firstorder_Skewness; Log-sigma-1-mm-3D_glcm_InverseDifferenceMomentNormalized; Log-sigma-1-mm-3D_glcm_MaximumalCorrelationCoefficient; Log10_log-sigma-1-mm-3D_glrlm_ShortRunLowGrayLevelEmphasis; Log-sigma-1-mm-3D_glszm_SizeZoneNonUniformityNormalized; Wavelet_HHH_firstorder_Kurtosis; Wavelet_HHH_firstorder_Skewness; Cbrt_wavelet-HHH_glcm_ClusterShade; Wavelet_HHH_glcm_DifferenceAverage; Wavelet- HHH_glcm_InverseVariance; Wavelet-HHH_glcm_MaximumCorrelationCoefficient; Wavelet-HHH_glszm_SizeZoneNonUniformityNormalized; Cbrt_wavelet-LLL_glcm_ClusterShade; and Log10_wavelet-LLL_glcm_MaximumProbability.

4. The method of claim 1, further comprising:
extracting a second plurality of radiomic features from the segmented scan of the patient;
providing the second plurality of radiomic features to a third machine learning model; and
obtaining, from the third machine learning model, a likelihood that the patient has a BRCA gene mutation.

5. The method of claim 4, wherein the second plurality of radiomics features comprises: Original_shape_Flatness; Original_firstorder_Kurtosis; Original_firstorder_Skewness; Original_glcm_InverseDifferenceMomentNormalized; Original_glcm_MaximumCorrelationCoefficient; Log10_original_glrlm_LongRunLowGrayLevelEmphasis; Log10sigma-5-mm-3D_firstorder_Kurtosis; Log10sigma-5-mm-3D_firstorder_Skewness; Cbrt_log-sigma-5-mm-3D_glcm_ClusterShade; Log-sigma-5-mm-3D_glcm_InformationalMeasureofCorrelation1; Log10_log-sigma-5-mm-3D_glrlm_LongRunHighGrayLevelEmphasis; Kig0sigma-5-mm-3D_glrlm_RunEntropy; Log-sigma-5-mm-3D_glszm_SizeZoneNonUniformityNormalized; Log10_log-sigma-5-mm-3D_glszm_ZonePercentage; Log-sigma-3-mm-3D_firstorder_Kurtosis; Log-sigma-3-mm-3D_firstorder_Skewness; Cbrt_log-sigma-3-dmm-3D_glcm_ClusterShade; Log-sigma-5-mm-3D_glcm_InformationalMeasureofCorrelation2; Log-sigma-3-dmm-3D_glszm_SmallAreaEmphasis; Log-sigma-1-mm-3D_firstorder_Kurtosis; Log-sigma-1-mm-3D_firstorder_Skewness; Cbrt_log-sigma-1-mm-3D_glcm_ClusterShade; Log-sigma-1-mm-3D_glcm_InformationalMeasureofCorrelation1; Log-sigma-1-mm-3D_glcm_MaximumCorrelationCoefficient; Log10_log-sigma-1-mm-3D_glszm_SmallAreaLowGrayLevelEmphasis; Wavelet-HHH_firstorder_Skewness; Wavelet-HHH_glcm_InverseDifferenceMomentNormalized; Wavelet-HHH_glcm_InverseVariance; Wavelet-HHH_glcm_MaximalCorrelationCoefficient; Log10_wavelet-HHH_glrlm_LongRunEmphasis; Wavelet-HHH_glszm_SizeZoneNonUniformityNormalized; Wavelet-HHH_glszm_SmallAreaEmphasis; Wavlet-LLL_glcm_Correlation; and Log10_wavelet-LLL_glcm_MaximumProbability.

6. The method of claim 1, wherein the first machine learning model comprises a variational autoencoder and a U-Net.

7. A system for non-invasively identifying triple negative breast cancer, comprising:
a processor; and
a memory, the memory containing a radiomic prediction application that configures the processor to:
obtain a magnetic resonance imaging scan of a patient's breast;
generate a tumor segmentation mask for the scan of the patient using a first machine learning model;
extract a plurality of radiomic features from the segmented scan of the patient;
provide the plurality of radiomic features to a second machine learning model; and
obtain, from the second machine learning model, a likelihood that the patient has triple negative breast cancer.

8. The system of claim 7, wherein the second machine learning model further provides an estimated survival time of the patient.

9. The system of claim 7, wherein the plurality of radiomics features comprises: Original_shape_SphericalDisproportion; Original_shape_Elongation; Original_shape_Flatness; Original_glcm_Correlation; Original_glcm_InverseDifferenceMomentNormalized; Original_glrlm_RunEntropy; Log10_original_glszm_LargeAreaHighGraylLevelEmphasis; Log-sigma-5-mm-3D_firstorder_Kurtosis; Log-sigma-5-mm-3D_glcm_informationalMeasureofCorrelation2; Log-sigma-5-mm-3D_glszm_GrayLevelNonUniformityNormalized; Log-sigma-3 mm-3D_firstorder_Kurtosis; Cbrt_log-sigma-3 mm-3D_glcm_ClusterShade; Log-sigma-3-mm-3D_glcm_InverseVariance; Log-sigma-3-mm-3D_glszm_SizeNoneNonUniformityNormalized; Log-sigma-1-mm-3D_firstorder_Skewness; Log-sigma-1-mm-3D_glcm_InverseDifferenceMomentNormalized; Log-sigma-1-mm-3D_glcm_MaximumalCorrelationCoefficient; Log10_log-sigma-1-mm-3D_glrlm_ShortRunLowGrayLevelEmphasis; Log-sigma-1-mm-3D_glszm_SizeZoneNonUniformityNormalized; Wavelet_HHH_firstorder_Kurtosis; Wavelet_HHH_firstorder_Skewness; Cbrt_wavelet-HHH_glcm_ClusterShade; Wavelet_HHH_glcm_DifferenceAverage; Wavelet-HHH_glcm_InverseVariance; Wavelet-HHH_glcm_MaximumCorrelationCoefficient; Wavelet-HHH_glszm_SizeZoneNonUniformityNormalized; Cbrt_wavelet-LLL_glcm_ClusterShade; and Log10_wavelet-LLL_glcm_MaximumProbability.

10. The system of claim 7, wherein the radiomic prediction application further configures the processor to:
extract a second plurality of radiomic features from the segmented scan of the patient;
provide the second plurality of radiomic features to a third machine learning model; and
obtain, from the third machine learning model, a likelihood that the patient has a BRCA gene mutation.

11. The system of claim 10, wherein the second plurality of radiomics features comprises: Original_shape_Flatness; Original_firstorder_Kurtosis; Original_firstorder_Skewness; Original_glcm_InverseDifferenceMomentNormalized; Original_glcm_MaximumCorrelationCoefficient; Log10_original_glrlm_LongRunLowGrayLevelEmphasis; Log10sigma-5-mm-3D_firstorder_Kurtosis; Log10sigma-5-mm-3D_firstorder_Skewness; Cbrt_log-sigma-5-mm-3D_glcm_ClusterShade; Log-sigma-5-mm-3D_glcm_InformationalMeasureofCorrelation1; Log10_log-sigma-5-mm-3D_glrlm_LongRunHighGrayLevelEmphasis; Kig0sigma-5-mm-3D_glrlm_RunEntropy; Log-sigma-5-mm-3D_glszm_SizeZoneNonUniformityNormalized; Log10_log-sigma-5-mm-3D_glszm_ZonePercentage; Log-sigma-3-mm-3D_firstorder_Kurtosis; Log-sigma-3-mm-3D_firstorder_Skewness; Cbrt_log-sigma-3-dmm-3D_glcm_ClusterShade; Log-sigma-5-mm-3D_glcm_InformationalMeasureofCorrelation2; Log-sigma-3-dmm-3D_glszm_SmallAreaEmphasis; Log-sigma-1-mm-3D_firstorder_Kurtosis; Log-sigma-1-mm-3D_firstorder_Skewness; Cbrt_log-sigma-1-mm-3D_glcm_ClusterShade; Log-sigma-1-mm-3D_glcm_InformationalMeasureofCorrelation1; Log-sigma-1-mm-3D_glcm_MaximumCorrelationCoefficient; Log10_log-sigma-1-mm-3D_glszm_SmallAreaLowGrayLevelEmphasis; Wavelet-HHH_firstorder_Skewness; Wavelet-HHH_glcm_InverseDifferenceMomentNormalized; Wavelet-HHH_glcm_InverseVariance; Wavelet- HHH_glcm_MaximalCorrelationCoefficient; Log10_wavelet-HHH_glrlm_LongRunEmphasis; Wavelet-HHH_glszm_SizeZoneNonUniformityNormalized; Wavelet-HHH_glszm_SmallAreaEmphasis; Wavlet-LLL_glcm_Correlation; and Log10_wavelet-LLL_glcm_MaximumProbability.

12. The system of claim 7, wherein the first machine learning model comprises a variational autoencoder and a U-Net.

13. A non-transitory, machine-readable storage medium containing instructions that when executed by a set of one or more processors, configure the one or more processors to:
obtain a magnetic resonance imaging scan of a patient's breast;
generate a tumor segmentation mask for the scan of the patient using a first machine learning model;
extract a plurality of radiomic features from the segmented scan of the patient;
provide the plurality of radiomic features to a second machine learning model; and
obtain, from the second machine learning model, a likelihood that the patient has triple negative breast cancer.

14. The non-transitory, machine-readable storage medium of claim 13, wherein the instructions, when executed by the set of one or more processors, further configure the one or more processors to obtain from the second machine learning model an estimated survival time of the patient.

15. The non-transitory, machine-readable storage medium of claim 13, wherein the plurality of radiomics features comprises: Original_shape_SphericalDisproportion; Original_shape_Elongation; Original_shape_Flatness; Original_glcm_Correlation; Original_glcm_InverseDifferenceMomentNormalized; Original_glrlm_RunEntropy; Log10_original_glszm_LargeAreaHighGraylLevelEmphasis; Log-sigma-5-mm-3D_firstorder_Kurtosis; Log-sigma-5-mm-3D_glcm_informationalMeasureofCorrelation2; Log-sigma-5-mm-3D_glszm_GrayLevelNonUniformityNormalized; Log-sigma-3 mm-3D_firstorder_Kurtosis; Cbrt_log-sigma-3 mm-3D_glcm_ClusterShade; Log-sigma-3-mm-3D_glcm_InverseVariance; Log-sigma-3-mm-3D_glszm_SizeNoneNonUniformityNormalized; Log-sigma-1-mm-3D_firstorder_Skewness; Log-sigma-1-mm-3D_glcm_InverseDifferenceMomentNormalized; Log-sigma-1-mm-3D_glcm_MaximumalCorrelationCoefficient; Log10_log-sigma-1-mm-3D_glrlm_ShortRunLowGrayLevelEmphasis; Log-sigma-1-mm-3D_glszm_SizeZoneNonUniformityNormalized; Wavelet_HHH_firstorder_Kurtosis; Wavelet_HHH_firstorder_Skewness; Cbrt_wavelet-HHH_glcm_ClusterShade; Wavelet_HHH_glcm_DifferenceAverage; Wavelet-HHH_glcm_InverseVariance; Wavelet-HHH_glcm_MaximumCorrelationCoefficient; Wavelet-HHH_glszm_SizeZoneNonUniformityNormalized; Cbrt_wavelet-LLL_glcm_ClusterShade; and Log10_wavelet-LLL_glcm_MaximumProbability.

16. The non-transitory, machine-readable storage medium of claim 13, wherein the instructions, when executed by the set of one or more processors, further configure the one or more processors to:
extract a second plurality of radiomic features from the segmented scan of the patient;
provide the second plurality of radiomic features to a third machine learning model; and
obtain, from the third machine learning model, a likelihood that the patient has a BRCA gene mutation.

17. The non-transitory, machine-readable storage medium of claim 16, wherein the second plurality of radiomics features comprises: Original_shape_Flatness; Original_firstorder_Kurtosis; Original firstorder_Skewness; Original_glcm_InverseDifferenceMomentNormalized; Original_glcm_MaximumCorrelationCoefficient; Log10_original_glrlm_LongRunLowGrayLevelEmphasis; Log10sigma-5-mm-3D_firstorder_Kurtosis; Log10sigma-5-mm-3D_firstorder_Skewness; Cbrt_log-sigma-5-mm-3D_glcm_ClusterShade; Log-sigma-5-mm-3D_glcm_InformationalMeasureofCorrelation1; Log10_log-sigma-5-mm-3D_glrlm_LongRunHighGrayLevelEmphasis; Kig0sigma-5-mm-3D_glrlm_RunEntropy; Log-sigma-5-mm-3D_glszm_SizeZoneNonUniformityNormalized; Log10_log-sigma-5-mm-3D_glszm_ZonePercentage; Log-sigma-3-mm-3D_firstorder_Kurtosis; Log-sigma-3-mm-3D_firstorder_Skewness; Cbrt_log-sigma-3-dmm-3D_glcm_ClusterShade; Log-sigma-5-mm-3D_glcm_InformationalMeasureofCorrelation2; Log-sigma-3-dmm-3D_glszm_SmallAreaEmphasis; Log-sigma-1-mm-3D_firstorder_Kurtosis; Log-sigma-1-mm-3D_firstorder_Skewness; Cbrt_log-sigma-1-mm-3D_glcm_ClusterShade; Log-sigma-1-mm-3D_glcm_InformationalMeasureofCorrelation1; Log-sigma-1-mm-3D_glcm_MaximumCorrelationCoefficient; Log10_log-sigma-1-mm-3D_glszm_SmallAreaLowGrayLevelEmphasis; Wavelet-HHH_firstorder_Skewness; Wavelet-HHH_glcm_InverseDifferenceMomentNormalized; Wavelet-HHH_glcm_InverseVariance; Wavelet-HHH_glcm_MaximalCorrelationCoefficient; Log10_wavelet-HHH_glrlm_LongRunEmphasis; Wavelet-HHH_glszm_SizeZoneNonUniformityNormalized; Wavelet-HHH_glszm_SmallAreaEmphasis; Wavlet-LLL_glcm_Correlation; and Log10_wavelet-LLL_glcm_MaximumProbability.

18. The non-transitory, machine-readable storage medium of claim 13, wherein the first machine learning model comprises a variational autoencoder and a U-Net.

* * * * *